US011858386B2

(12) United States Patent
Tsiaras et al.

(10) Patent No.: US 11,858,386 B2
(45) Date of Patent: Jan. 2, 2024

(54) SEALED BOAT SEAT SUSPENSION

(71) Applicant: Fox Factory, Inc., Duluth, GA (US)

(72) Inventors: Philip Tsiaras, Dacula, GA (US);
Dennis K. Wootten, Milford, NH (US);
Paul Hammerstrom, Milford, NH (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/747,913

(22) Filed: May 18, 2022

(65) Prior Publication Data

US 2023/0173960 A1 Jun. 8, 2023

Related U.S. Application Data

(63) Continuation of application No. 16/664,555, filed on Oct. 25, 2019, now Pat. No. 11,364,826.

(60) Provisional application No. 62/752,850, filed on Oct. 30, 2018.

(51) Int. Cl.
*B60N 2/50* (2006.01)
*B63B 29/04* (2006.01)

(52) U.S. Cl.
CPC ............... *B60N 2/50* (2013.01); *B60N 2/505* (2013.01); *B60N 2/509* (2013.01); *B63B 29/04* (2013.01); *B63B 2029/043* (2013.01)

(58) Field of Classification Search
CPC .......... B60N 2/50; B60N 2/505; B60N 2/509; B63B 2029/043; B63B 29/04
See application file for complete search history.

(56) References Cited

U.S. PATENT DOCUMENTS

| | | |
|---|---|---|
| 3,682,431 A | 8/1972 | Vivian |
| 3,705,745 A | 12/1972 | Ambrosius |
| 3,840,265 A | 10/1974 | Stirling et al. |
| 3,985,388 A | 10/1976 | Hogan |
| 4,525,010 A | 6/1985 | Trickey et al. |
| 4,817,908 A | 4/1989 | Hanlon et al. |
| 5,273,240 A | 12/1993 | Sharon |
| 5,294,085 A | 3/1994 | Lloyd et al. |
| 5,758,859 A | 6/1998 | Gonzalez |
| 5,952,823 A | 9/1999 | Sprecher et al. |
| 6,152,401 A | 11/2000 | Green |
| 6,237,889 B1 | 5/2001 | Bischoff |
| 6,267,071 B1 | 7/2001 | Ellis |
| 6,692,076 B1 | 2/2004 | Burer |

(Continued)

FOREIGN PATENT DOCUMENTS

| | | | |
|---|---|---|---|
| DE | 1801159 A1 | * | 4/1970 |
| DE | 1801159 A1 | | 4/1970 |

(Continued)

*Primary Examiner* — Eret C McNichols

(57) ABSTRACT

A sealed boat seat suspension including a plurality of sealed rails. The sealed boat seat suspension also includes a boat seat attachment component which is coupled to the plurality of sealed rails. The sealed boat seat suspension also includes a boat seat attachment component which is movable with respect to at least a portion of the plurality of sealed rails. The sealed boat seat suspension also includes a suspension component which is coupled to the boat seat attachment component such that the suspension component provides at least some control of movement of the boat seat attachment component with respect to at least a portion of the plurality of sealed rails.

12 Claims, 10 Drawing Sheets

(56) References Cited

U.S. PATENT DOCUMENTS

| | | | |
|---|---|---|---|
| 7,039,512 B2 * | 5/2006 | Swinbanks | B63B 39/005 |
| | | | 248/550 |
| 7,484,799 B2 * | 2/2009 | Meyer | B60N 2/525 |
| | | | 297/216.17 |
| 7,744,155 B2 * | 6/2010 | List | B60N 2/42736 |
| | | | 297/216.17 |
| 7,983,813 B2 * | 7/2011 | Ummethala | B60N 2/544 |
| | | | 267/136 |
| 8,382,181 B2 * | 2/2013 | Bourgraf | A61G 1/02 |
| | | | 296/65.13 |
| 8,550,553 B1 * | 10/2013 | Clark | B60N 2/24 |
| | | | 297/216.16 |
| 8,678,465 B1 | 3/2014 | Aragon et al. | |
| 8,888,161 B1 * | 11/2014 | Aragon | B64D 25/04 |
| | | | 296/68.1 |
| 8,939,502 B2 * | 1/2015 | Grant | B60N 2/0232 |
| | | | 297/216.16 |
| 9,132,753 B1 * | 9/2015 | Campbell | B60N 2/62 |
| 9,353,818 B2 | 5/2016 | Marking | |
| 9,494,390 B2 | 11/2016 | Berman | |
| 10,052,984 B1 | 8/2018 | Bosen et al. | |
| 10,166,889 B1 | 1/2019 | Lou et al. | |
| 10,480,908 B2 | 11/2019 | Huang et al. | |
| 11,235,843 B2 * | 2/2022 | Charboneau | B60N 2/525 |
| 2007/0273192 A1 * | 11/2007 | Van Druff | B60N 2/4242 |
| | | | 297/339 |
| 2009/0189407 A1 | 7/2009 | Lewis | |
| 2010/0225081 A1 | 9/2010 | Galasso et al. | |
| 2011/0037300 A1 | 2/2011 | Pettigrew et al. | |
| 2016/0047632 A1 | 2/2016 | Berman | |
| 2018/0037141 A1 | 2/2018 | Huang et al. | |
| 2019/0118680 A1 * | 4/2019 | Sagebiel | B60N 2/4279 |
| 2020/0290708 A1 * | 9/2020 | Charboneau | B60N 2/525 |

FOREIGN PATENT DOCUMENTS

| | | | | |
|---|---|---|---|---|
| DE | 2818478 A1 * | 11/1979 | | |
| DE | 2818478 A1 | 11/1979 | | |
| FR | 3058949 A1 * | 5/2018 | | B60N 2/501 |
| GB | 2383264 A * | 6/2003 | | B60N 2/504 |
| WO | 2008084692 A1 | 7/2008 | | |
| WO | WO-2008084692 A1 * | 7/2008 | | B60N 2/501 |
| WO | 2009095073 A1 | 8/2009 | | |
| WO | WO-2009095073 A1 * | 8/2009 | | B60N 2/14 |

* cited by examiner

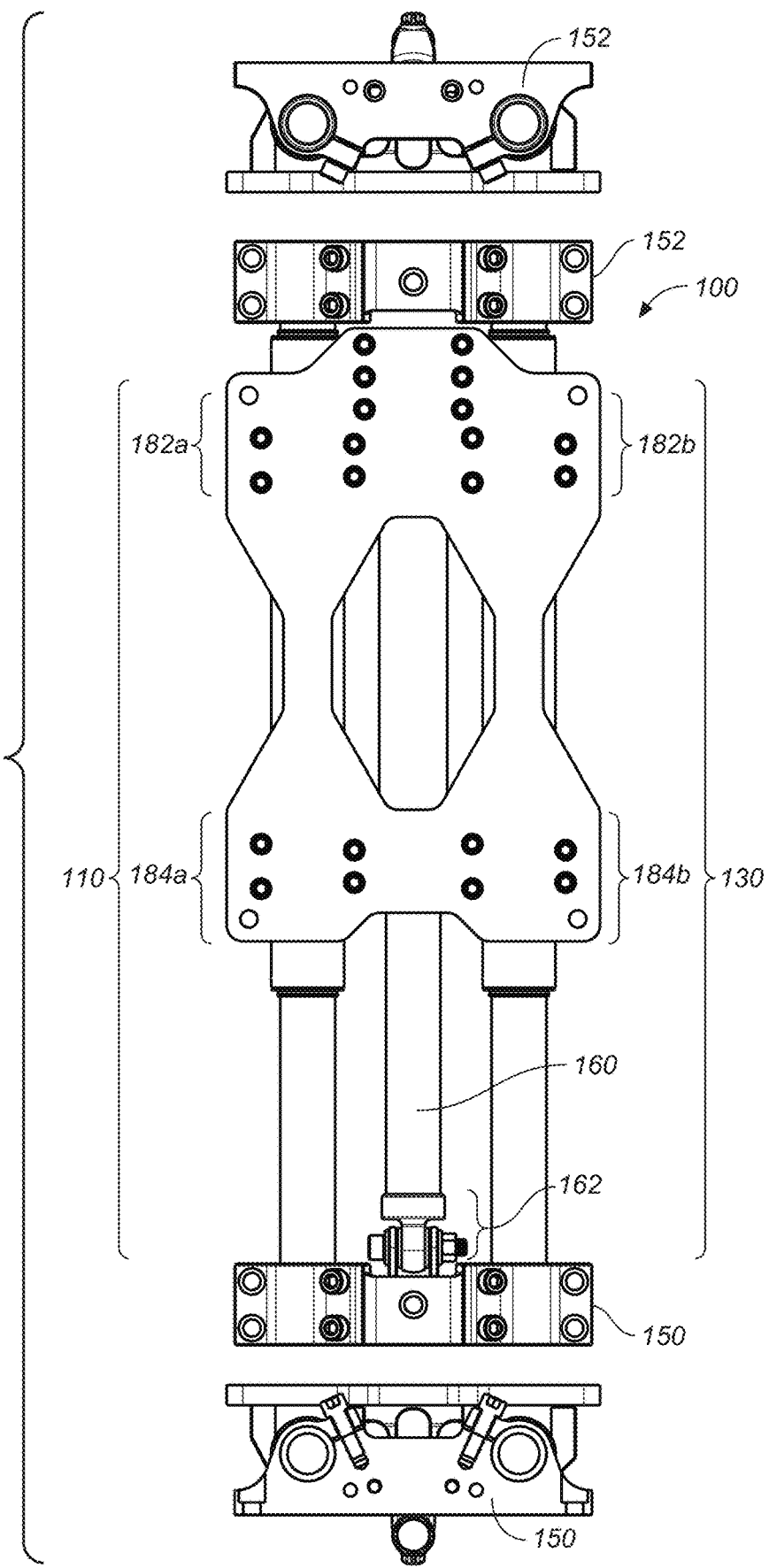

SEALED BOAT SEAT SUSPENSION

CROSS-REFERENCE TO RELATED APPLICATIONS

This application is a Continuation of and claims priority to the U.S. patent application Ser. No. 16/664,555 filed on Oct. 25, 2019, entitled "SEALED BOAT SEAT SUSPENSION" by Philip Tsiaras et al., assigned to the assignee of the present application, and is hereby incorporated by reference in its entirety.

The application Ser. No. 16/664,555 claims the benefit of and claims priority to the U.S. Provisional Patent Application No. 62/752,850 filed on Oct. 30, 2018, entitled "SEALED BOAT SEAT SUSPENSION" by Philip Tsiaras et al., assigned to the assignee of the present application, and is hereby incorporated by reference in its entirety.

FIELD OF THE INVENTION

Embodiments of the present technology relate generally to a suspension for a boat seat.

BACKGROUND

Various approaches have been utilized to provide suspension for a boat seat. As an example, certain military boats have a boat seat suspension with one end of the boat seat suspension mounted to the floor of the boat and another end of the boat seat suspension mounted to a boat seat. Conventional boat seat suspensions have significant drawbacks associated therewith.

BRIEF DESCRIPTION OF THE DRAWINGS

Aspects of the present invention are illustrated by way of example, and not by way of limitation, in the accompanying drawings, wherein:

FIGS. 1A-1E provide a plurality of views of a sealed boat seat suspension, in accordance with an embodiment of the present invention.

Figure 1A:
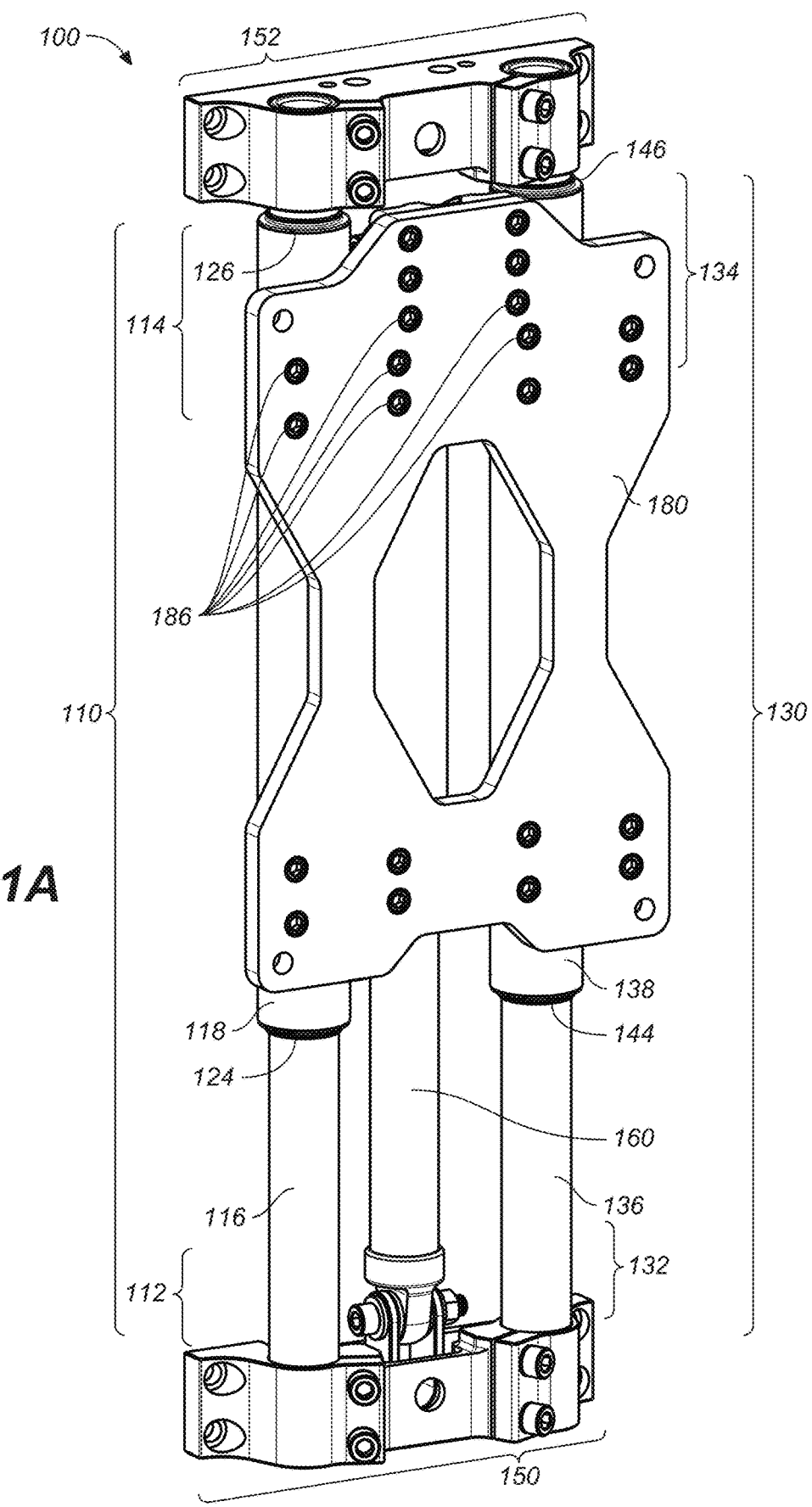
Figure 1C:
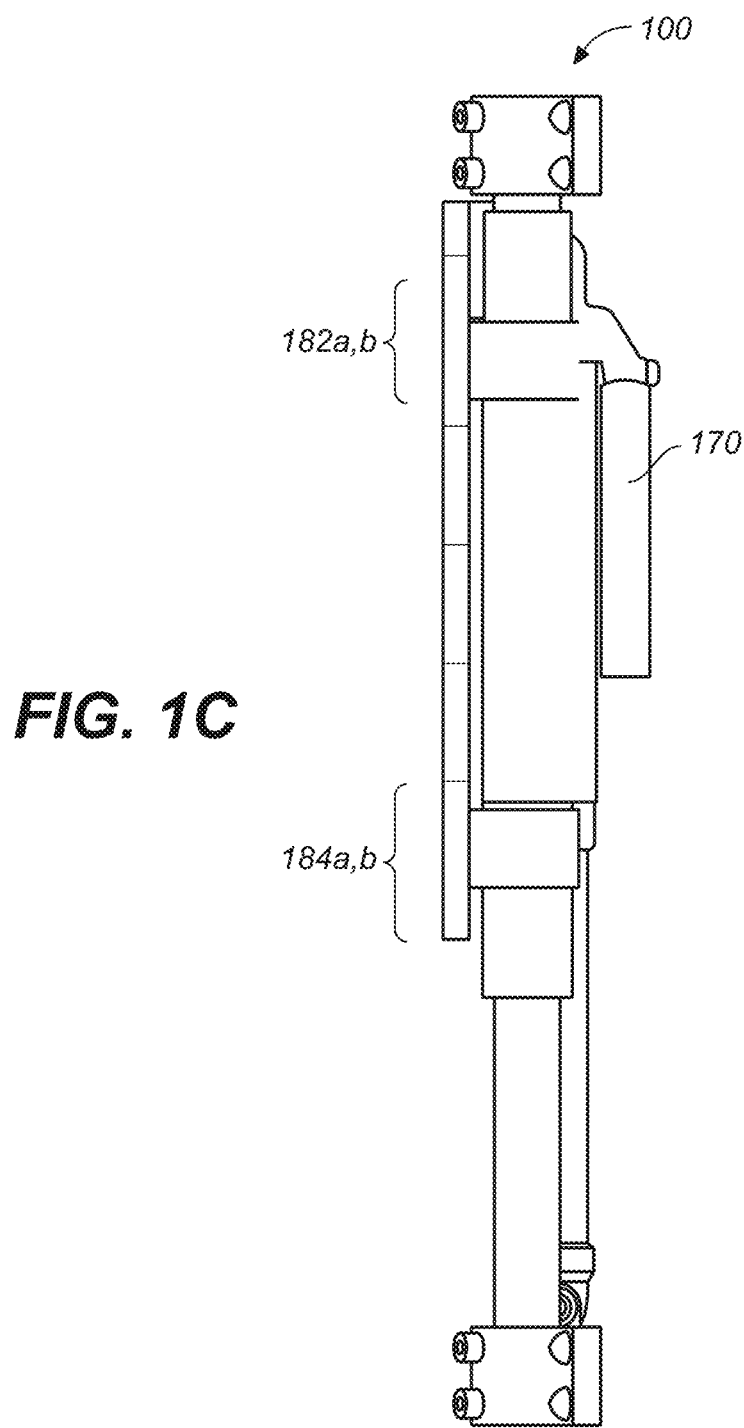
Figure 1D:
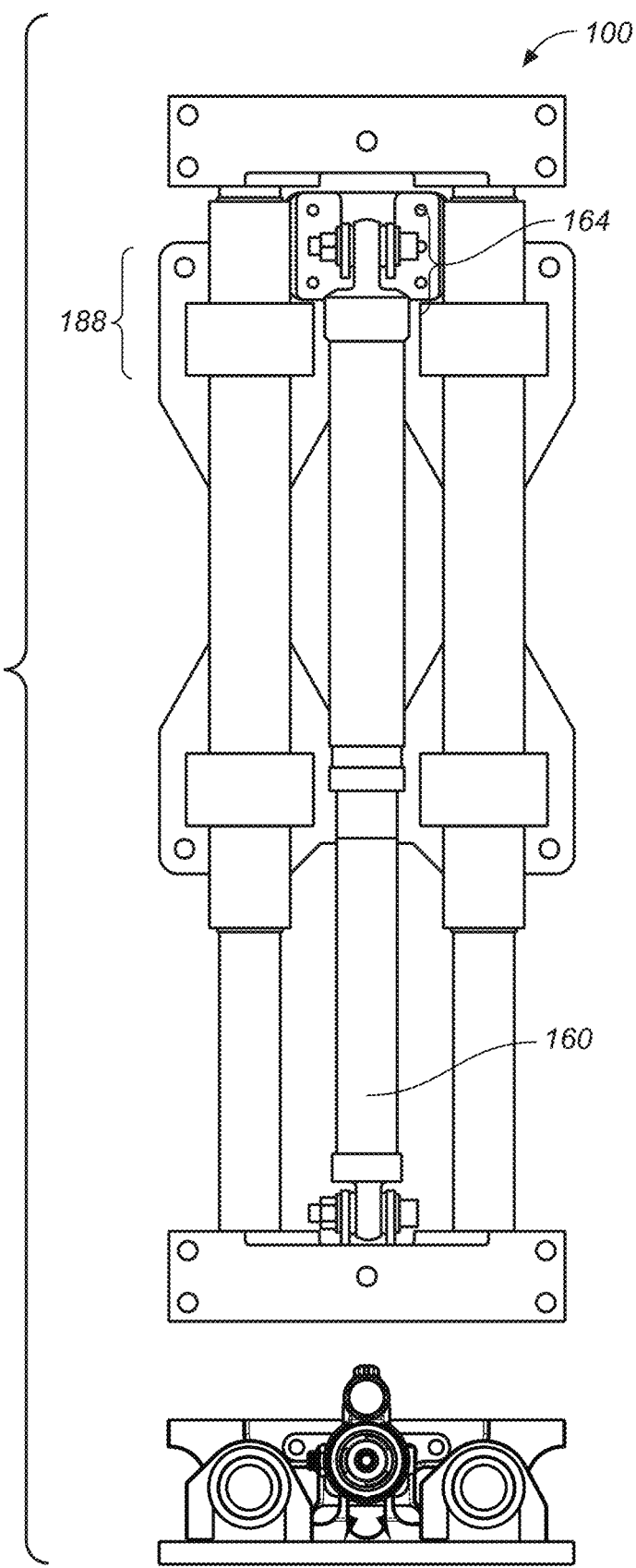
Figure 1E:
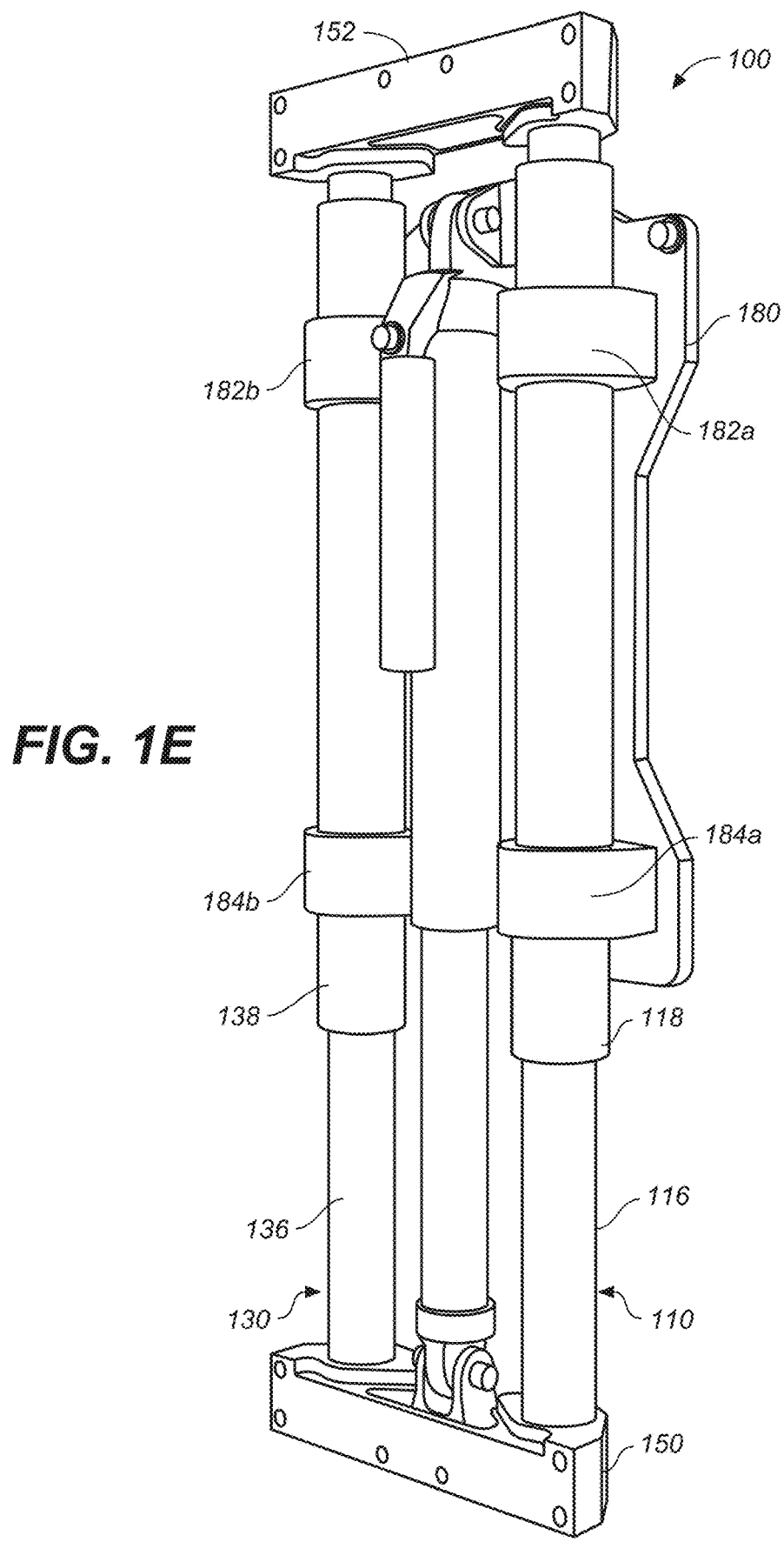

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

As a very brief overview, the following discussion will begin with a description which focuses primarily on the structure and the various components comprising the present sealed boat seat suspension 100. The following discussion will then include a description which includes aspects of the operation of the present sealed boat seat suspension 100.

Referring now to FIGS. 1A-1E, a series of views of a sealed boat seat suspension 100 is provided in accordance with one embodiment of the present invention. In the present embodiment, sealed boat seat suspension includes a first rail 110 and a second rail 130. In the present embodiment, first rail 110 has a first end 112 and a second end 114. First rail 110 further includes an inner tube 116 and outer tube 118. In an embodiment of the present invention, outer tube 118 is slidable along at least a portion of inner tube 116 such that outer tube 118 slides axially about an inner tube 116. Additionally, in one embodiment of the present invention, first rail 110 includes bushings 124 and 126 (hidden) which create a sealed relationship between an interior surface of outer tube 118 with respect to the outer surface as inner tube 116. As a result, as outer tube 118 slides axially with respect to inner tube 116, bushings 124 and 126 ensure that the aforementioned sealed relationship is maintained between the interior surface of outer tube 118 and the outer surface as inner tube 116. In an embodiment of the present invention an oil bath (hidden) is present between the interior surface of outer tube 118 and the outer surface as inner tube 116. In one such embodiment, bushings 124 and 126 also confine the oil bath between the interior surface of outer tube 118 and the outer surface of inner tube 116. The sealed relationship between the interior surface of outer tube 118 and the outer surface of inner tube 116 is discussed further below.

In various embodiments of the present invention, first rail 110 contains no spring and/or damping components. In some such embodiments, first rail 110 contains only seals (hidden) and bushings 124 and 126 (hidden) and the oil bath (hidden) to provide for lubrication between the interior surface of outer tube 118 and the outer surface of inner tube 116. In one embodiment, bushings 124 and 126 are located near wipers. Such lubrication is beneficial to the axial movement of outer tube 118 with respect to inner tube 116. It should be noted, however, that various other embodiments of the present sealed boat seat suspension 100 will include spring and/or damping components within first rail 110. Referring still to first rail 110, in various embodiments of the present invention, the upper seal is comprised of a seal which is different from the seal used as the lower seal. In some embodiments, the choice of seal for the upper seal and the lower seal is based upon parameters including, but not limited to, the pumping ratio corresponding to the seal. Furthermore, in some embodiments of the present invention, first rail 110 does not include a seal between outer tube 118 and inner tube 116.

Referring still to FIGS. 1A-1E, second rail 130 has a first end 132 and a second end 134. Second rail 130 further includes an inner tube 136 and outer tube 138. In an embodiment of the present invention, outer tube 138 is slidable along at least a portion of inner tube 136 such that outer tube 138 slides axially about an inner tube 136. Additionally, in one embodiment of the present invention, second rail 130 includes bushings 144 and 146 (hidden) which create a sealed relationship between an interior surface of outer tube 138 with respect to the outer surface as inner tube 136. In one embodiment, bushings 144 and 146 are located near wipers. As a result, as outer tube 138 slides axially with respect to inner tube 136, bushings 144 and 146 ensure that the aforementioned sealed relationship is maintained between the interior surface of outer tube 138 and the outer surface as inner tube 136. In an embodiment of the present invention, an oil bath (hidden) is present between the interior surface of outer tube 138 and the outer surface of inner tube 136. In one such embodiment, bushings 144 and 146 also confine the oil bath between the interior surface of outer tube 138 and the outer surface of inner tube 136. The sealed relationship between the interior surface of outer tube 138 and the outer surface of inner tube 136 is discussed further below.

In various embodiments of the present invention, second rail 130 contains no spring and/or damping components. In some such embodiments, second rail 130 contains only seals (hidden) and bushings 144 and 146 and the oil bath (hidden) to provide lubrication between the interior surface of outer tube 138 and the outer surface of inner tube 116. Such lubrication is beneficial to the axial movement of outer tube 118 with respect to inner tube 136. It should be noted, however, that various other embodiments of the present sealed boat seat suspension 100 will include spring and/or damping components within second rail 130. Referring still to second rail 130, in various embodiments of the present invention, the upper seal is comprised of a seal which is different from the seal used as the lower seal. In some embodiments, the choice of seal for the upper seal and the lower seal is based upon parameters including, but not limited to, the pumping ratio corresponding to the seal. Furthermore, in some embodiments of the present invention, second rail 130 does not include a seal between outer tube 138 and inner tube 136.

As shown in FIGS. 1A-1E, in one embodiment of the present invention, first end 112 of first rail 110 is coupled to bottom bracket 150, and second end 114 of first rail 110 is coupled to top bracket 152. In a similar manner, in one embodiment of the present invention, first end 132 of second rail 130 is coupled to bottom bracket 150, and second end 134 of second rail 130 is coupled to top bracket 152.

With reference still to FIGS. 1A-1E, in one embodiment of the present invention, a bottom double clamp feature is used to couple first end 112 of first rail 110 to bottom bracket 150. Similarly, in one embodiment of the present invention, a top double clamp feature is used to couple second end 114 of first rail 110 to top bracket 152. Similarly, in one embodiment of the present invention, the bottom double clamp feature is also used to couple first end 132 of second rail 130 to bottom bracket 150. Similarly, in one embodiment of the present invention, the top double clamp feature is used to couple second end 134 of second rail 130 to top bracket 152. As a result, in embodiments of the present invention first rail 110 and second rail 130 are rigidly maintained in a fixed relationship with respect to each other at least partially due to being retained by and between top bracket 152 and bottom bracket 150. As a result, the positional relationship between first rail 110 and second rail 130 remains substantially constant during operation of the present sealed boat seat suspension 100. It should be noted that embodiments of the present invention are also well suited to using various features and structures other than, or in addition to, top bracket 152 and bottom bracket 150 to retain the positional relationship between first rail 110 and second rail 130, and to ensure that the positional relationship between first rail 110 and second rail 130 remains substantially constant during operation of the present sealed boat seat suspension 100.

Embodiments of the present sealed boat seat suspension 100 further include a back plate 180. As shown in FIGS. 1A-1E, back plate 180 is coupled to first rail 110 at locations 182a and 184a. More specifically, back plate 180 is coupled to outer tube 118 of first rail 110 at locations 182a and 184a. Also, in embodiments of the present sealed boat seat suspension 100, back plate 180 is coupled to second rail 130 at locations 182b and 184b. More specifically, back plate 180 is coupled to outer tube 138 of second rail 130 at locations 182b and 184b. In so doing, in embodiments of the present sealed boat seat suspension 100, back plate 180, outer tube 118 and outer tube 138 are maintained in a static or fixed relationship with respect to each other. That is, in embodiments of the present sealed boat seat suspension 100, back plate 180, outer tube 118 and outer tube 138 will move in unison with each other and maintain the same positional relationship with respect to each other. As one example, any upward axial movement of outer tube 118 with respect to inner tube 116, results in an equal upward movement of outer tube 138 with respect to inner tube 136 due to their intercoupled relationship via back plate 180. Correspondingly, in embodiments of the present sealed boat seat suspension 100, any upward axial movement of outer tube 118 with respect to inner tube 116, results in an equi-distant upward movement of back plate 180. Stated differently, in embodiments of the present sealed boat seat suspension 100, outer tube 118 and outer tube 138 will always move in unison, will always move the same axial distance, and will always move in the same axial direction. Also, in embodiments of the present sealed boat seat suspension 100, back plate 180 will move in unison with (i.e., move the same distance as, and move in the same direction as) any movement of outer tube 118 and outer tube 138.

In embodiments of the present sealed boat seat suspension 100, back plate 180 also includes a plurality of openings (typically shown as 186) to accommodate the coupling of back plate 180 with various boat seat attachment features. By providing the plurality of openings 186 in back plate 180, embodiments of the present sealed boat seat suspension 100 are well suited to use with the varied types of boat seat attachments features (and configuration preferences) corresponding to the numerous boat seat manufacturers. It should be noted, that in various embodiments of the present invention, a boat seat or boat seat attachment is coupled to first rail 110 and second rail 130 without the use of a back plate. That is, in some embodiments of the present invention, a beat seat or boat seat attachment is directly mounted to first rail 110 and second rail 130.

Referring still to FIGS. 1A-1E, sealed boat seat suspension 100 further includes a suspension component 160 disposed between first rail 110 and second rail 130. In various embodiments of the present sealed boat seat suspension 100, suspension component 160 has a first end 162 and a second end 164. In one embodiment of the present sealed boat seat suspension 100, first end 162 of suspension component 160 is coupled to bottom bracket 150. Furthermore, in one embodiment of the present sealed boat seat suspension 100, suspension component 160 is coupled to bottom bracket 150 using a polyurethane bushing. It should be noted that various other embodiments of the present sealed boat seat suspension 100 utilize various other structures and components to couple suspension component 160 to bottom bracket 150.

Similarly, as shown in the various views of FIGS. 1A-1E, in one embodiment of the present sealed boat seat suspension 100, second end 164 of suspension component 160 is coupled to back plate 180 at location 188. Furthermore, in one embodiment of the present sealed boat seat suspension 100, suspension component 160 is coupled to back plate 180 using a polyurethane bushing. It should be noted that various other embodiments of the present sealed boat seat suspension 100 utilize various other structures and components to couple suspension component 160 to back plate 180. In so doing, in embodiments of the present sealed boat seat suspension 100, back plate 180 and second end 164 of suspension component 160 will move in unison with each other. As one example, any upward movement of back plate 180 will result in upward movement of second end 164 of suspension component 160. Correspondingly, in embodiments of the present sealed boat seat suspension 100, any upward axial movement of outer tube 118 with respect to inner tube 116, results in an equidistant upward movement of back plate 180 and an upward (expansion/rebound movement) of second end 164 of suspension component 160 away from first end 162 of suspension component 160. Conversely, in embodiments of the present sealed boat seat suspension 100, any downward axial movement of outer tube 118 with respect to inner tube 116, results in an equidistant downward movement of back plate 180 and a downward (compressive movement) of second end 164 of suspension component 160 toward first end 162 of suspension component 160.

In various other embodiments of the present sealed boat seat suspension 100, suspension component 160 will have, for example, end 162 coupled to top bracket 152 and end 164 coupled to back plate 180. Similarly, in various other embodiments of the present sealed boat seat suspension 100, suspension component 160 will have, for example, end 164 coupled to bottom bracket 150 and end 162 coupled to back plate 180. In still another embodiment of the present sealed boat seat suspension 100, suspension component 160 will have, for example, end 164 coupled to top bracket 152 and end 162 coupled to back plate 180. More generally stated, embodiments of the present sealed boat seat suspension 100 are well suited to numerous configurations in which a suspension component is coupled between a static portion of sealed boat seat suspension 100 and a movable portion of sealed boat seat suspension 100 to provide at least some control of the movement between a static portion and a movable portion of sealed boat seat suspension 100.

Figure 2:
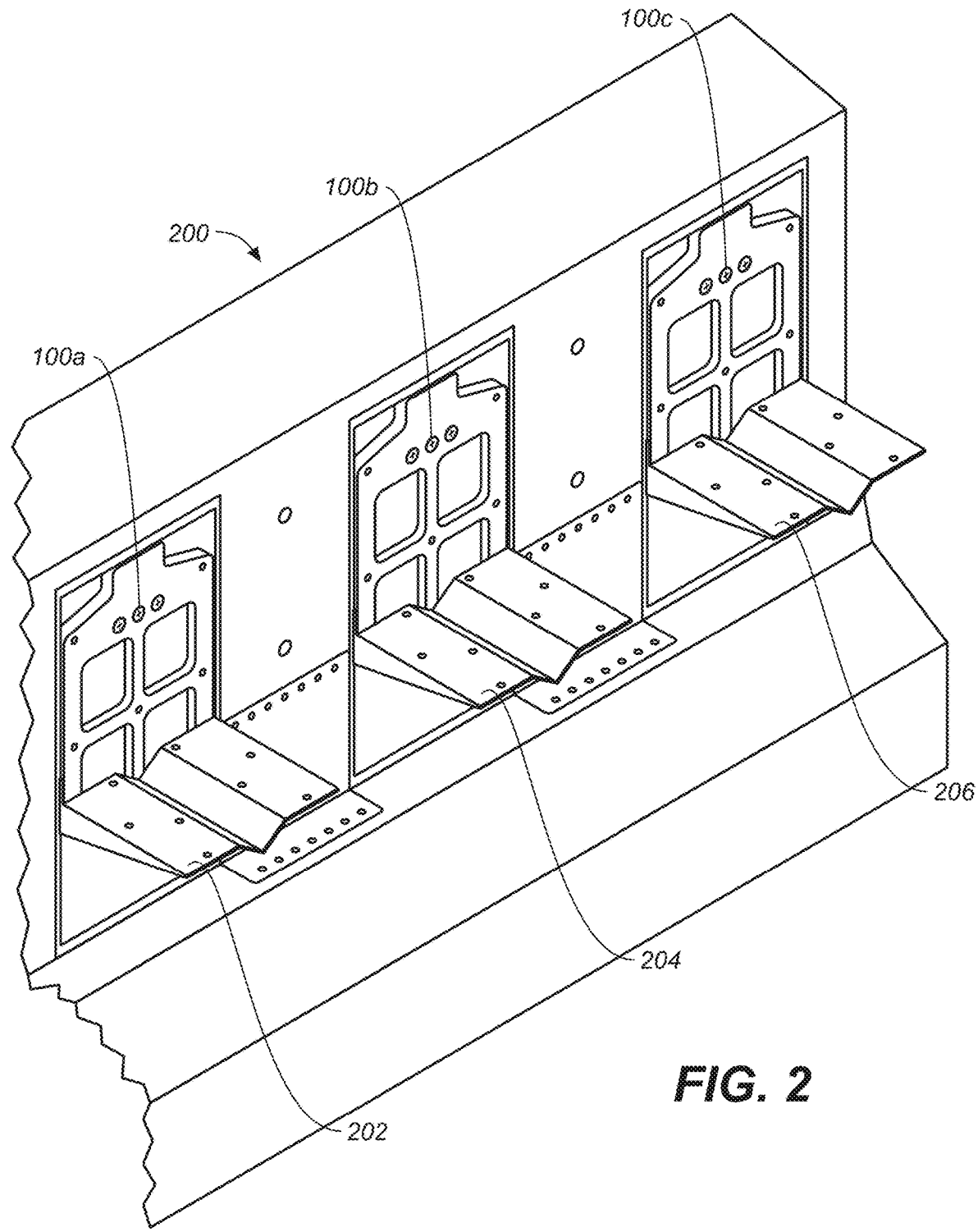
FIG. 2 is a perspective view of a console including several instances of the present sealed boat seat suspension, in accordance with an embodiment of the present invention.

As a result, in embodiments of the present sealed boat seat suspension 100, damping and/or spring characteristics of suspension component 160 (as are described further below) will control the amount of force required to move back plate 180 as it travels between bottom bracket 150 and top bracket 152. Thus, in various embodiments of the present sealed boat seat suspension 100, a boat seat feature such as, for example a boat seat support member (as is depicted in FIG. 2 and as described below in the description corresponding to FIG. 2) is coupled to back plate 180. In various embodiments of the present sealed boat seat suspension 100, when assembly is completed sealed boat seat suspension 100 will ultimately provide damping for the boat seat coupled thereto and a passenger utilizing the boat seat. Details pertaining to such operation of the present sealed boat seat suspension 100, is provided in the description corresponding to FIG. 6, and also in the description corresponding to FIG. 7, provided below.

Referring still to FIGS. 1A-1E, in various embodiments of the present invention, suspension component 160 is disposed between first rail 110 and second rail 130 such that the main axis of suspension component 160 is positioned co-planar with respect to the main axis of first rail 110 and second rail 130. It will be understood, however, that embodiments of the present sealed boat seat suspension 100 are well suited to configurations in which the main axis of suspension component 160 is not positioned co-planar with respect to the main axis of first rail 110 and second rail 130.

In various embodiments of the present sealed boat seat suspension 100, suspension component 160 includes a spring feature (hidden) such as, for example, an air spring. In one embodiment of the present sealed boat seat suspension 100, the spring feature includes a linear air spring including a bumper for preventing bottom-out of suspension component 160. In one embodiment of the present sealed boat seat suspension 100, suspension component 160 includes a reservoir component 170. In some embodiments of the present sealed boat seat suspension 100, reservoir component 170 is utilized to obtain a linear air spring curve for suspension component 160. Further, in various embodiments of the present sealed boat seat suspension 100, the air spring of suspension component 160 is user-adjustable. Such adjustability of the air spring is described in further detail below. It should be noted, that embodiments of the present sealed boat seat suspension 100 are also well suited to having suspension component 160 include various other spring features and spring structures including, but not limited to, various other types of air (or other compressible gas) spring structures and/or a non-air spring structure such as, for example, a coiled spring structure.

Referring again to FIGS. 1A-1E, in various embodiments of the present sealed boat seat suspension 100, suspension component 160 includes a damping feature (hidden) such as, for example, a damping piston and valve assembly for controlling the flow of damping fluid from one side of the damping piston to the other side of the damping piston. Further, in various embodiments of the present sealed boat seat suspension 100, the damping feature of suspension component 160 is user-adjustable. Such adjustability or tunability of the damping feature is described in further detail below. It should be noted, that embodiments of the present sealed boat seat suspension 100 are also well suited to having suspension component 160 include various other damping features and damping structures in addition to, or in lieu of, the damping features described above. In embodiments of the present sealed boat seat suspension 100, various other damping features and damping structures include, but are not limited to, internal bypass assemblies, position-sensitive damping features, compression-only damping features, jointly-controlled compression and rebound damping features, independently-controlled compression and rebound damping features, and numerous other damping features and structures.

Additionally, in one embodiment of the present sealed boat seat suspension 100, suspension component 160 is predesigned/preconfigured to readily enable changes to the damping features. In one such embodiment, suspension component 160 is predesigned/preconfigured to enable electronic valving to be utilized within suspension component 160. In one such embodiment, the use of such electronic valving is accomplished without having to completely replace suspension component 160 with an entirely new suspension component. In one embodiment, an electronic or "active" valve will vary a flow rate through an inlet or outlet passage within the valve itself. See, as an example, the electronic valve of FIGS. 2-4 of U.S. Pat. No. 9,353,818 which is incorporated by reference herein, in its entirety, as an example of a type of "electronic" or "active" valve.

Embodiments of the present sealed boat seat suspension 100, are structured and manufactured to mitigate deleterious effects of corrosion associated with water, and, particularly, saltwater environments. For example, embodiments of the present sealed boat seat suspension 100 utilize similar metals for mating or proximately located components. As a result, galvanic-based degradation common to conventional boating products is reduced or eliminated in embodiments of the present sealed boat seat suspension 100. Similarly, embodiments of the present sealed boat seat suspension 100 use barriers between dissimilar metals (and/or, will choose the dissimilar materials to be as close as possible on the galvanic scale) to reduce deleterious galvanic-based degradation and corrosion.

In various embodiments of the present sealed boat seat suspension 100, many, if not all, fasteners used in embodiments of the present sealed boat seat suspension 100 (for example, fasteners used to couple first rail 110 and second rail 130 to bottom bracket 150 and to top bracket 152, fasteners used to couple back plate 180 to outer tube 118 and outer tube 138, etc.) are formed of a high strength stainless steel coated with a dielectric material to create fasteners which are resistant to corrosion and galvanic-induced degradation. Such a process is particularly beneficial during assembly of the various embodiments of the present sealed boat seat suspension 100. Additionally, various embodiments of the present sealed boat seat suspension 100, utilize aluminum as the material to form inner tubes 116 and 136, outer tubes 118 and 138, various tube caps, and bushings etc. Although such materials are recited for various components, embodiments of the present sealed boat seat suspension 100 are also well suited to the use of other materials.

With reference again to FIGS. 1A-1E, embodiments of the present sealed boat seat suspension 100 provide additional benefits and advantages conventional boat seats. As another example, in the various embodiments of the present sealed boat seat suspension 100, the sealed relationship between outer tube 118 and inner tube 116, and, similarly, outer tube 138 and inner tube 136 provides improved stability to present sealed boat seat suspension 100. Specifically, the "oil bath containing" and "sealed relationship" between outer tube 118 and inner tube 116, and, similarly, outer tube 138 and inner tube 136 provides an omni-directional load bearing strut for sealed boat seat suspension 100. As a result, when non-axial high loads are imposed upon sealed boat seat suspension 100 (e.g., due to the cantilevered extension of a boat seat support extending from back plate 180 (as is described and shown in detail below in FIGS. 2 and 3)), sealed boat seat suspension 100 is able to distribute the imposed force in an axis-symmetric manner. As a further advantage of such axis-symmetric force distribution, and also partially due to the configuration of suspension component 160 (i.e., between first rail 110 and second rail 130), suspension component 160 of present sealed boat seat suspension 100 does not experience any side load forces. Instead, as a distinct advantage of present sealed boat seat suspension 100, suspension component 160 only experiences axial forces.

Figure 4:
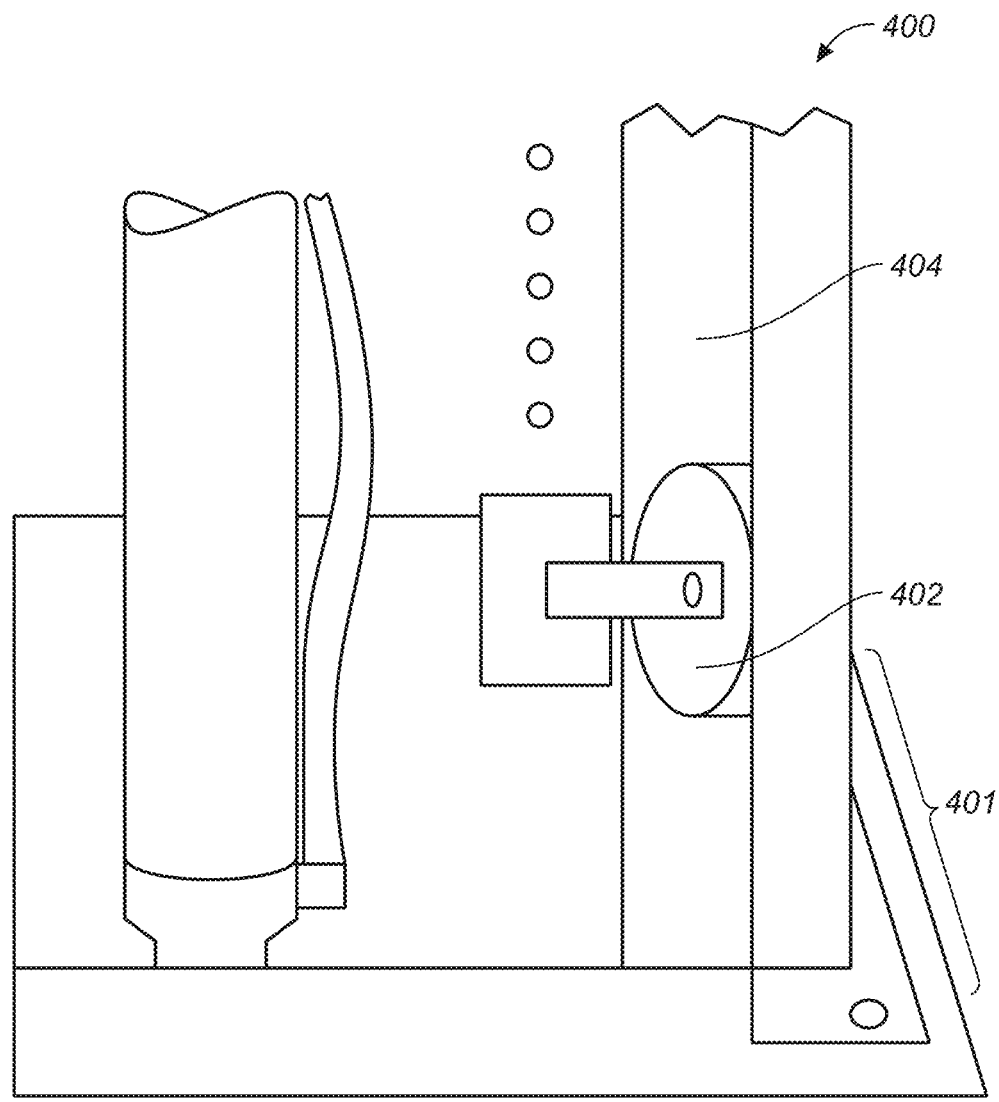
FIG. 4 is a backside perspective view of a conventional floor mounted boat seat.
Figure 5:
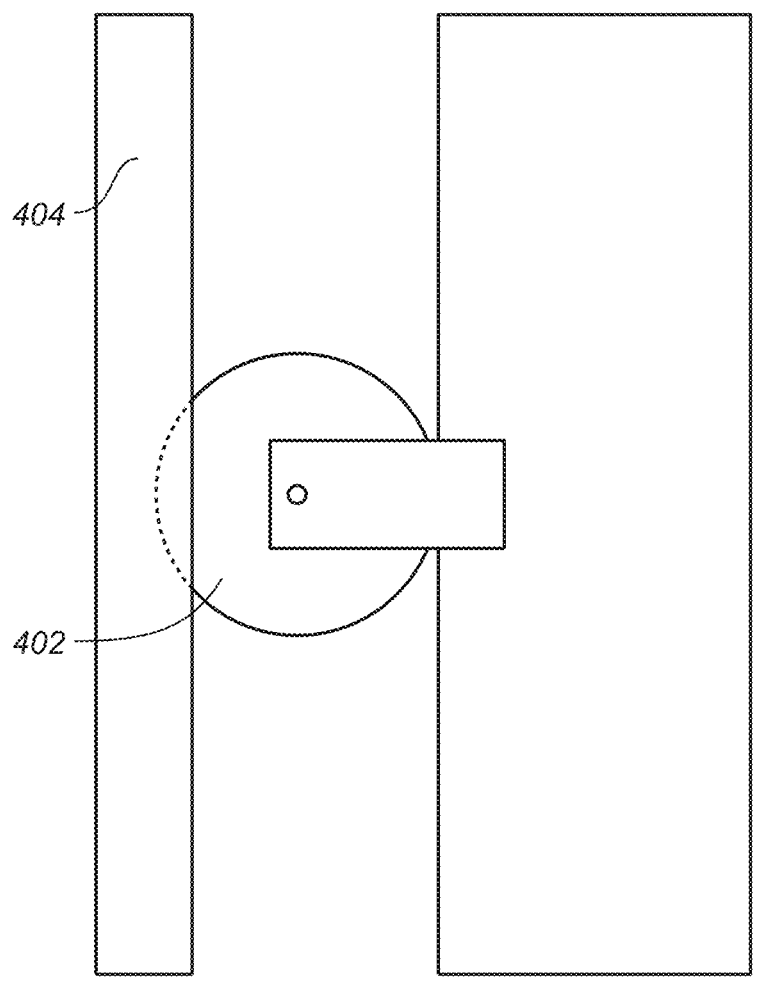
FIG. 5 is close up view of the conventional non-sealed wheel-in-track system of FIG. 4.

Referring briefly to FIG. 4, a backside perspective view of a conventional floor mounted boat seat 400 is provided. As shown in FIG. 4, a single attachment location 401 (the floor of the boat) ultimately results in an inherently less stable boat seat. That is, in the present sealed boat seat suspension 100, top and bottom mounting (via, for example, top bracket 152 and bottom bracket 150) of sealed boat seat suspension 100 improves the stability of sealed boat seat suspension 100 over conventional floor mount-only seats. Additionally, as shown in FIG. 4, conventional boat seats are not sealed. Referring briefly to FIG. 5, a close up view of the conventional, non-sealed, wheel-in-track system of FIG. 4 is provided. It can be seen that in such a conventional non-sealed approach, it is possible, and potentially probable, that particulates (e.g., metal shavings, chips/pieces off of wheel 402, dirt, debris, etc.) will enter track 404 and restrict, or entirely prevent, wheel 402 from rolling along track 404. Such contamination and resulting impedance to the movement of wheel 402 is further exacerbated in the environments and under the conditions in which boats are typically used (sand-containing beach areas, salt spray, heavy user traffic, food particles, fishing-related debris, etc.). It should be noted here, that the various embodiments of the present sealed boat seat suspension 100 (in which a sealed relationship exists between outer tube 118 and inner tube 116, and, similarly, between outer tube 138 and inner tube 136) do not suffer from contamination-based drawbacks of conventional boat seats.

Referring again to FIG. 4, in such a conventional system 400, in order for wheel 402 to roll along track 404 (and not become bound and unable to move), a gap must be provided between wheel 402 and track 404. Such a required gap inherently introduces instability in conventional boat seats. Additionally, the required gap introduces "slop" into conventional boat seats. Further, the gap and unsealed structure of conventional boat seats allows non-axial loads to be imparted to wheel 402, track 404 and any suspension that may be coupled thereto. Hence, such conventional boat seats are clearly unable to achieve the axis-symmetric force distribution realized in present sealed boat seat suspension 100. As a further drawback, conventional boat seats (unlike present sealed boat seat suspension 100) are subject to damage and degradation due to subjecting an attached suspension to a non-axial load.

With reference still to FIGS. 1A-1E, embodiments of the present sealed boat seat suspension 100 provide still more benefits and advantages as compared to conventional boat seats. As still another example, in the various embodiments of the present sealed boat seat suspension 100, outer tube 118 and outer tube 138 have a relatively large span with respect to inner tube 116 and inner tube 136, respectively. This length of the span of the sealed relationship between outer tube 118 and inner tube 116, and, similarly, outer tube 138 and inner tube 136 provides improved stability to present sealed boat seat suspension 100. More specifically, when non-axial high loads are imposed upon sealed boat seat suspension 100 (e.g., due to the cantilevered extension of a boat seat support extending from back plate 180 (as is described and shown in detail below in FIGS. 2 and 3)), the aforementioned large length of the span of the sealed relationship between outer tube 118 and inner tube 116, and, similarly, outer tube 138 and inner tube 136, distributes the non-axial high loads along the length of the span. As a result, the large span length of the present sealed boat seat suspension 100 enables distribution of the non-axial high loads and allows sealed boat seat suspension 100 to operate effectively even when subjected to high non-axial loads and forces.

With reference now to FIG. 2, a perspective view of a console 200 including several instances (100a, 100b and 100c) of the present sealed boat seat suspension 100 is shown. In such an embodiment, a console structure 200 will be present on a boat and may constitute an important part of the aesthetic of that boat. In the embodiment of FIG. 2, three instances 100a, 100b and 100c of the present sealed boat seat suspension 100 are disposed within console 200. As shown in FIG. 2, a boat seat support portion 202 is coupled to back plate 180 of sealed boat seat suspension 100a. Also, a boat seat support portion 204 is coupled to back plate 180 of sealed boat seat suspension 100b. Finally, in console 200 of FIG. 2, a boat seat support portion 206 is coupled to back plate 180 of sealed boat seat suspension 100c. As stated above, in various embodiments of the present sealed boat seat suspension 100, back plate 180 includes a plurality of openings 186 to accommodate the coupling of back plate 180 with various boat seat attachment features (e.g., boat seat support portions 202, 204 and 206). By providing the plurality of openings 186 in back plate 180, embodiments of the present sealed boat seat suspension 100 are well suited to use with the varied types of boat seat attachment features (and configuration preferences) corresponding to the numerous boat seat manufacturers.

Referring to FIG. 2 (and also to FIGS. 1A-1E), embodiments of the present sealed boat seat suspension 100 provide significant advantages over conventional boat seats. As one example, embodiments of the present sealed boat seat suspension 100 are well suited to being integrated into a boat console without disturbing the "aesthetic" or "look and feel" of the boat. Such an accomplishment is particularly important in "high-end" boats where consumers demand a pleasing "aesthetic" or "look and feel" partially due to the high price point of such marine vessels. As just one specific example, embodiments of the present sealed boat seat suspension 100 are able to be mounted flush against the vertical walls or within the opening formed in console 200. As a result, and as clearly shown in FIG. 2, embodiments of the present sealed boat seat suspension 100 are seamlessly integrated in a visually pleasing manner to existing boat console form factors. Moreover, as shown in the embodiment of FIG. 2, embodiments of the present sealed boat seat suspensions 100a, 100b and 100c are not even visible, thereby maintaining the desired boat aesthetic, once present sealed boat seat suspensions 100a, 100b and 100c are integrated into console 200 and once the various boat seats are installed.

Referring again to FIG. 2 (and also to FIGS. 1A-1E), embodiments of the present sealed boat seat suspension 100 provide even further significant advantages over conventional boat seats. As another such example, embodiments of the present sealed boat seat suspension 100 increase rigidity over conventional floor mounted boats seats, particularly when the present sealed boat seat suspension 100 is mounted in a console 200. As stated above, embodiments of the present sealed boat seat suspension 100 are able to be mounted flush against the vertical walls or within the opening formed in console 200. More specifically, bottom bracket 150 is mounted to the lower location on a vertical surface of console 200, and top bracket 152 is mounted to a higher location on the vertical surface of console 200. This dual mounting approach (as compared to a single floor mounted conventional boat seat) provides increased stability over conventional boat seats. Also, the significant span length (e.g., the distance between bottom bracket 150 and top bracket 152) found in present sealed boat seat suspension 100 adds even more stability to the present sealed boat seat suspension 100.

Figure 3:
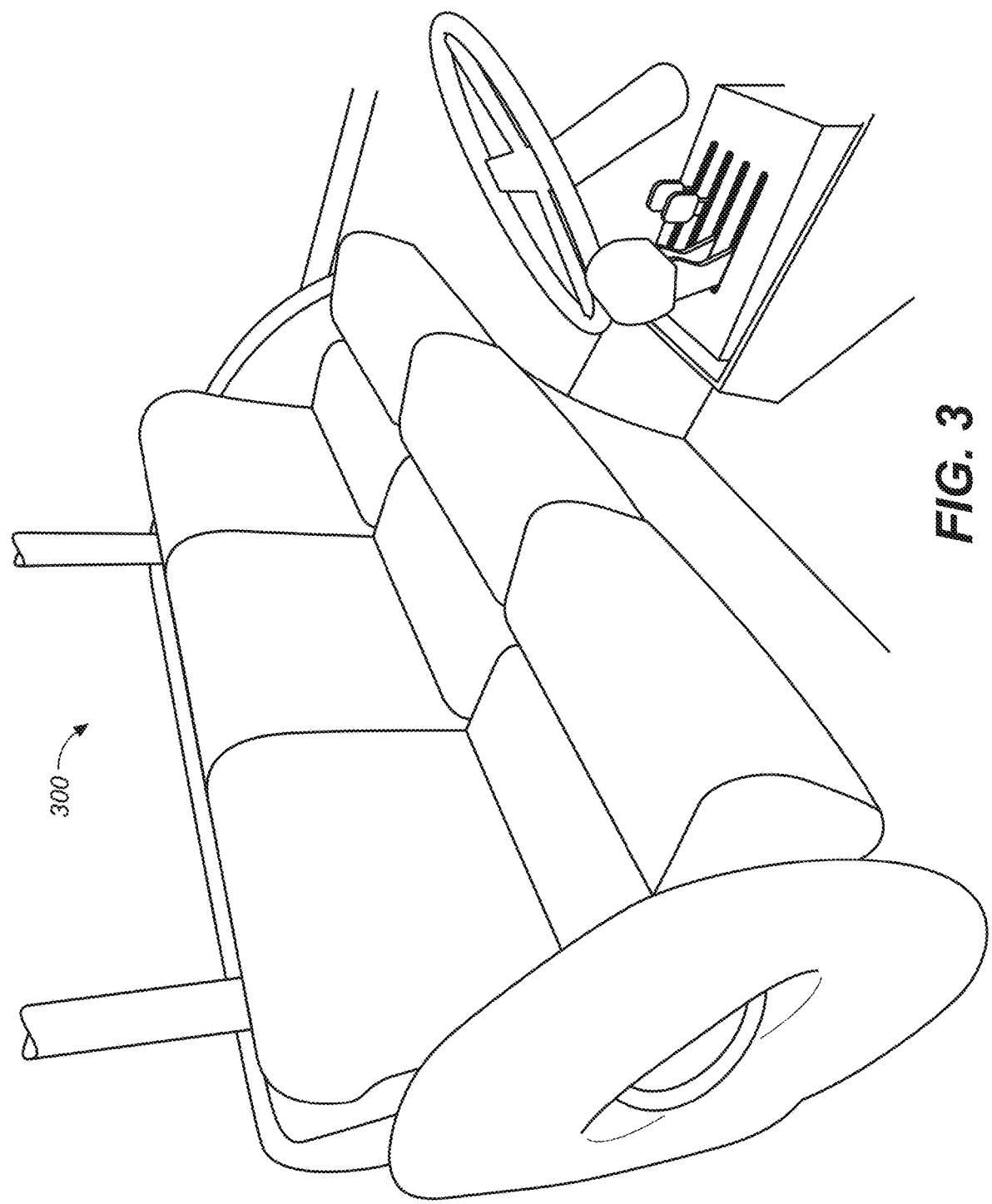
FIG. 3 is a perspective view of a completed console-based boat seat having embodiments of the present sealed boat seat suspension integrated therein, in accordance with an embodiment of the present invention.

With reference briefly to FIG. 3, a perspective view of a completed (fully assembled) console-based boat seat 300 (having embodiments of the present sealed boat seat suspension 100 integrated therein) is provided. As is clearly depicted in FIG. 3, the present sealed boat seat suspension 100 is not visible once console-based boat seat 300 is fully assembled. Additionally, FIG. 3 readily depicts that the "aesthetic" and/or "look and feel" intended by the boat builder, and desired by the consumer, is maintained.

Figure 6:
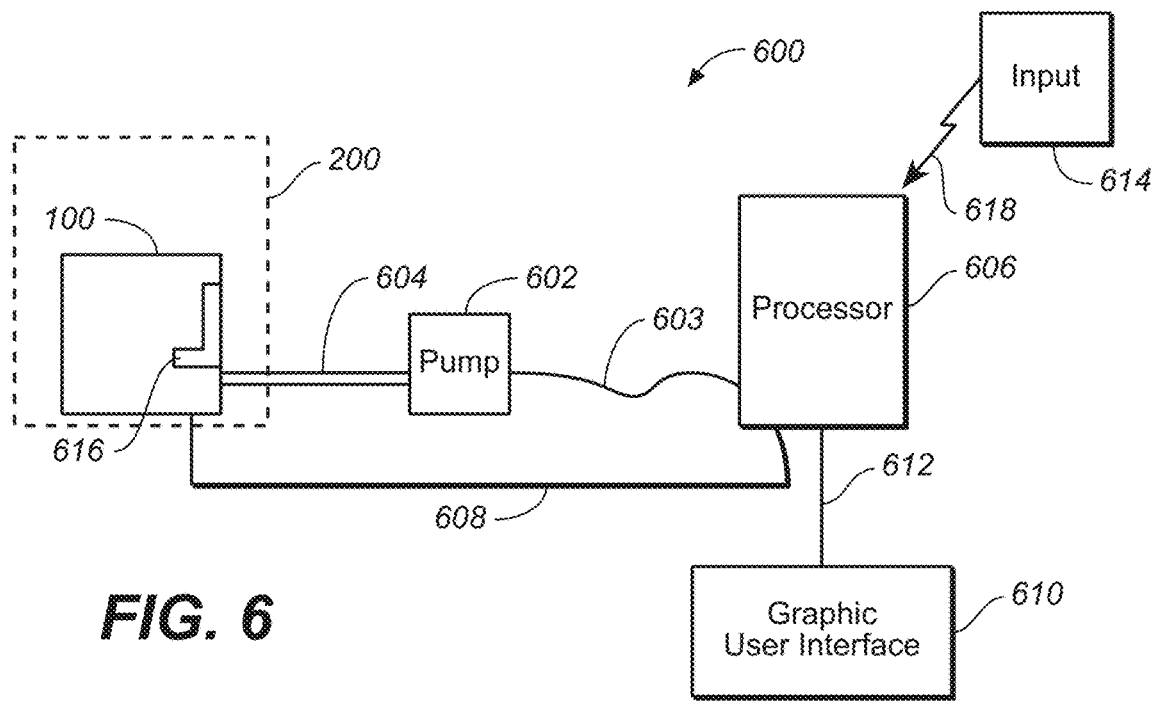
FIG. 6 is a schematic diagram of a system including a sealed boat seat suspension, in accordance with an embodiment of the present invention.
Figure 7:
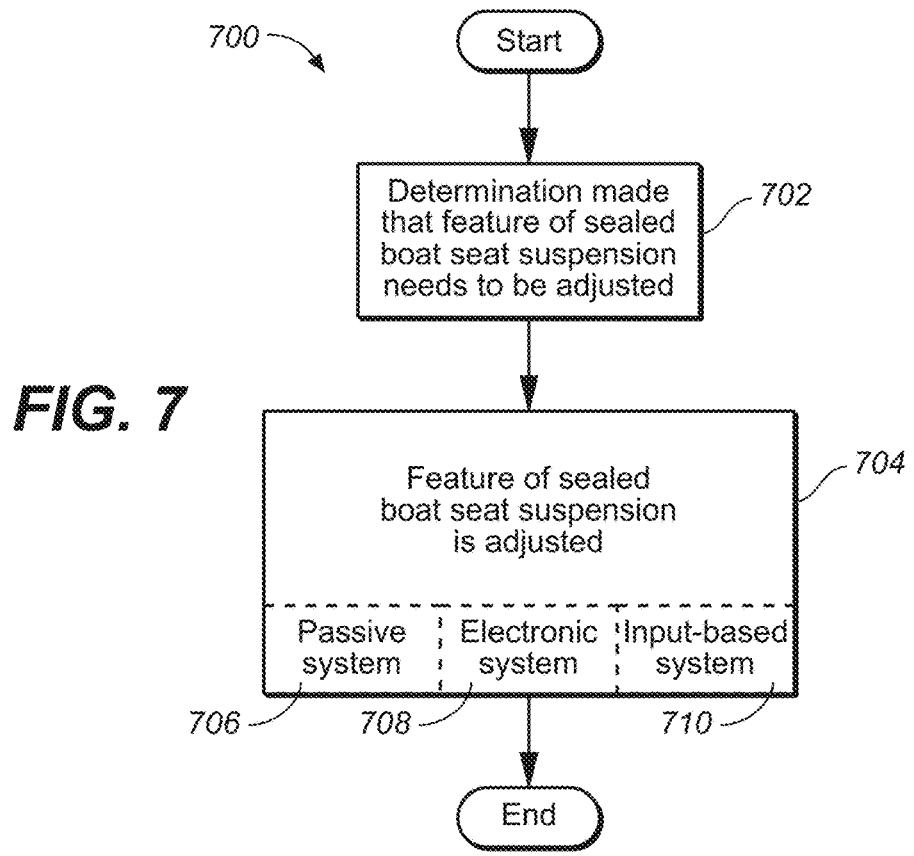
FIG. 7 is a flow chart of operations performed using the system of FIG. 6 in accordance with an embodiment of the present invention.

Referring now to FIG. 6, a schematic diagram of a system 600 including a sealed boat seat suspension 100 is provided. It should also be noted that system 600 further schematically depicts sealed boat seat suspension 100 disposed within optional console 200. Hence, in some embodiments of system 600, sealed boat seat suspension 100 is disposed within console 200, but in other embodiments of system 600, sealed boat seat suspension is not disposed within a console. System 600 of FIG. 6 further schematically depicts a boat seat 616 coupled to sealed boat seat suspension 100. In one embodiment, system 600 schematically depicts a pump 602 which is coupled to sealed boat seat suspension 100 via hose 604. In various embodiments of system 600, pump 602 is a manual pump which a user manually utilizes to establish a desired air spring pressure (which will also correspond, in some embodiments, to a boat seat height or position of boat seat 616 (e.g., the position of backplate 180 between top bracket 150 and bottom bracket 152)) with respect to sealed boat seat suspension 100. Additionally, in some embodiments of system 600, pump 602 is attached to, or integrated within, sealed boat seat suspension 100.

Referring again to FIG. 6, in various other embodiments of system 600, pump 602 is electronically controlled by, for example, processor 606 via connector 603. In some embodiments of system 600, processor 606 also includes an Inertial Measurement Unit (IMU). Although a physical connector 603 is depicted in the embodiment of FIG. 6, it should be noted that various embodiments of system 600 include a wireless link (e.g., but not limited to, a Bluetooth link) between processor 606 and pump 602. In one such embodiment, processor 606 receives information via, for example, connector 608 regarding the air pressure within suspension component 160, and/or reservoir component 170. Although a physical connector 608 is depicted in the embodiment of FIG. 6, it should be noted that various embodiments of system 600 include a wireless link (e.g., but not limited to, a Bluetooth link) between sealed boat seat suspension 100 and processor 606. Based upon such information, processor 606 autonomously adjusts the pressure within suspension component 160, and/or reservoir component 170, to a preselected or proper air pressure level for the present conditions. Such conditions will include, but are not limited to, passenger weight applied to seat 616, desired initial height of seat 616, desired stiffness of the air spring for suspension component 160, desired travel distance for seat 616 along sealed boat seat suspension 100, current conditions (e.g., wave heights, wave frequencies, wind speeds, wind directions, etc.) at the body of water in which the boat utilizing system 600 is being used, and various other conditions of interest. In one such embodiment, processor 606 of system 600 will calculate the air pressure for suspension component 160 based on a known value pertaining to the square inches of piston area (for a piston of the air spring) and the detected air pressure within suspension component 160.

With reference still to FIG. 6, in some embodiments of system 600, processor 606 receives remotely derived input 614 via a communication link 618. In one such embodiment, such remotely derived input 614 includes, but is not limited to, weather and marine conditions (e.g., wave heights, wave frequencies, wind speeds, wind directions, etc.) for the body of water in which the boat utilizing system 600 is being used. Based upon such remotely derived input 614, processor 606 autonomously adjusts the pressure within suspension component 160, and/or reservoir component 170, to a preselected or proper air pressure level for the present weather and marine conditions. In various embodiments of system 600, other suitable variables are used by processor 606 in addition to, or in lieu of, the variables described above, in order to determine a proper air pressure for suspension component 160 and/or reservoir component 170. Such other suitable variables include, but are not limited to, for example, piston rod compression strain, eyelet strain, boat mounted accelerometer (or tilt/inclinometer) data or any other suitable boat performance data and/or data corresponding to the performance, or state, of any component within present sealed boat seat suspension 100.

Referring still to FIG. 6, in another embodiment of system 600, a graphic user interface 610 is utilized to, for example, adjust the air pressure within suspension component 160 of sealed boat seat suspension 100. In one such embodiment, a user utilizes graphic user interface 610 to adjust the air pressure of suspension component 160 electronically and remotely from sealed boat seat suspension 100. In one such embodiment, graphic user interface 610 provides input to processor 606 to adjust the air pressure of suspension component 160 (according to user input received at graphic user interface 610) via for example connector 612. Once again, although a physical connector 612 is depicted in the embodiment of FIG. 6, it should be noted that various embodiments of system 600 include a wireless link (e.g., but not limited to, a Bluetooth link) between graphic user interface 610 and processor 606. In various embodiments, graphic user interface 610 includes graphic icons (or physical switches) to enable a user to adjust the air pressure within suspension component 160 to a desired level.

Referring again to FIG. 6, and as stated above, in various embodiments of sealed boat seat suspension 100, suspension component 160 is predesigned/preconfigured to readily enable changes to the damping features. In one such embodiment, suspension component 160 is predesigned/preconfigured to enable electronic valving to be utilized within suspension component 160. In one such embodiment, an electronic or "active" valve will vary a flow rate through an inlet or outlet passage within the valve itself. In various embodiments of present sealed boat seat suspension 100, the use of an active/e-valve enables independent control of both compression and rebound damping characteristics for suspension component 160. In one such embodiment, the active valve is electronically controlled by, for example, processor 606 via connector 608. Similarly, in one embodiment, processor 606 receives information regarding suspension component 160 via connector 608. Such information will include, but is not limited to, the position of a damping piston within suspension component 160, the velocity of a damping piston within suspension component 160, pressures within suspension component 160, and the like. In various embodiments, the piston rod position is measured using a damping piston position transducer, and the piston rod/ damping piston velocity is measured using a piston rod velocity transducer. In various embodiments of system 600, other suitable variables are used in addition to, or in lieu of, the variables described above. Such other suitable variables include, but are not limited to, for example, piston rod compression strain, eyelet strain, boat mounted accelerometer (or tilt/inclinometer) data or any other suitable boat performance data and/or data corresponding to the performance, or state, of any component within present sealed boat seat suspension 100.

In one embodiment, the damping piston's position within a damping chamber of suspension component 160 is determined using an accelerometer to sense modal resonance of the suspension component 160. Such resonance will change depending on the position of the damping piston and processor 606 of system 600 is calibrated to correlate resonance with axial position of the damping piston. In one such embodiment, system 600 also includes a suitable proximity sensor or linear coil transducer or other electro-magnetic transducer which is incorporated in the damping chamber of suspension component 160 to provide a sensor to monitor the position and/or speed of the damping piston (and suitable magnetic tag) with respect to a housing of the suspension component 160.

In one embodiment, the magnetic transducer includes a waveguide and a magnet, such as a doughnut (toroidal) magnet that is joined to the housing of suspension component 160 and oriented such that the magnetic field generated by the magnet passes through the rod and the waveguide. Electric pulses are applied to the waveguide from a pulse generator that provides a stream of electric pulses, each of which is also provided to processor 606 for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to processor 606 via, for example, connector 608.

By comparing the time of application of a particular electric pulse and a time of return of a sonic torsional strain wave pulse back along the waveguide, processor 606 can calculate a distance of the magnet from the coil assembly or the relative velocity between the waveguide and the magnet. Processor 606 provides an output signal, which is digital or analog, proportional to the calculated distance and/or velocity. A transducer-operated arrangement for measuring damping piston rod speed and velocity is described in U.S. Pat. No. 5,952,823 which is incorporated by reference herein in its entirety.

Further, in various embodiments of system 600, processor 606 accesses position sensor data for boat seat 161 (or other corresponding components of sealed boat seat suspension 100) to obtain desired travel lengths for boat seat 616 with respect to sealed boat seat suspension 100. In yet another embodiment, processor 606 utilizes received information regarding suspension component 160 to minimize G-loads on boat seat 616 and a passenger seated therein.

Although a physical connector 608 is depicted in the embodiment of FIG. 6, it should be noted that various embodiments of system 600 include a wireless link (e.g., but not limited to, a Bluetooth link) between processor 606 and the active valve of suspension component 160. Based upon received information, processor 606 autonomously adjusts the damping characteristics of suspension component 160 to a preselected or proper level of damping (or firmness) appropriate for the present conditions. Such conditions will include, but are not limited to, passenger weight applied to seat 616, desired initial height of seat 616, desired stiffness of suspension component 160, desired travel distance for seat 616 along sealed boat seat suspension 100, current conditions (e.g., wave heights, wave frequencies, wind speeds, wind directions, etc.) at the body of water in which the boat utilizing system 600 is being used, and various other conditions of interest.

With reference still to FIG. 6, in some embodiments of system 600, processor 606 receives remotely derived input 614 via a communication link 618. In one such embodiment, such remotely derived input 614 includes, but is not limited to, weather and marine conditions (e.g., wave heights, wave frequencies, wind speeds, wind directions, etc.) for the body of water in which the boat utilizing system 600 is being used. Based upon such remotely derived input 614, processor 606 autonomously adjusts the active valve of suspension component 160 to obtain a preselected or proper damping characteristic for the present weather and marine conditions. Additionally, it should be noted that due to typical boat speeds and water conditions, sealed boat seat suspension 100 is particularly well-suited to real-time adjustment of the damping characteristics of suspension component 160. Similarly, due to typical boat speeds and water conditions, sealed boat seat suspension 100 is particularly well-suited to the use of electronically-adjusted and position-dependent damping characteristics for suspension component 160.

Referring still to FIG. 6, in another embodiment of system 600, a graphic user interface 610 is utilized to, for example, adjust the damping characteristics of suspension component 160 of sealed boat seat suspension 100. In one such embodiment, a user utilizes graphic user interface 610 to adjust the damping characteristics of suspension component 160 electronically and remotely from sealed boat seat suspension 100. In one such embodiment, graphic user interface 610 provides input to processor 606 to adjust the damping characteristics of suspension component 160 (according to user input received at graphic user interface 610) via for example connector 612. Once again, although a physical connector 612 is depicted in the embodiment of FIG. 6, it should be noted that various embodiments of system 600 include a wireless link (e.g., but not limited to, a Bluetooth link) between graphic user interface 610 and processor 606. In various embodiments, graphic user interface 610 includes graphic icons (or physical switches) to enable a user to adjust the damping characteristics of suspension component 160 to a desired level.

It should further be understood that in various embodiments of the present sealed boat seat suspension 100, both the air spring characteristics and the damping characteristics of suspension component 160 are adjustable as described above. Additionally, in some embodiments of present sealed boat seat suspension 100, when an adjustment is made to air spring characteristics, processor 606 automatically adjusts the damping characteristics of suspension component 160 to maintain the desired or appropriate damping characteristics of suspension component 160. Similarly, in some embodiments of present sealed boat seat suspension 100, when an adjustment is made to the damping characteristics of suspension component 160, processor 606 automatically adjusts air spring characteristics to maintain the desired or appropriate air spring characteristics of suspension component 160.

Hence, embodiments of the present boat seat suspension 100 are well suited to use within a larger system such as, for example, system 600 of FIG. 6. Moreover, embodiments of the present boat seat suspension 100 can be described as being utilized in a "passive system" wherein changes are only made to, for example, an air pressure of suspension component 160 when a user manually alters the air pressure of suspension component 160 by, for example, manually pumping air into or manually removing air from suspension component 160. Additionally, embodiments of the present boat seat suspension 100 can be described as being utilized in a "electronic system" wherein changes are made to, for example, an air pressure of suspension component 160 (or an active valve within suspension component 160) when a user interacts with graphic user interface and thereby directs system 600 to alter an air pressure of suspension component 160 (or an active valve within suspension component 160). Furthermore, embodiments of the present boat seat suspension 100 can be described as being utilized in a "input-based system" wherein processor 606 autonomously makes changes to, for example, an air pressure of suspension component 160 (or an active valve within suspension component 160) based upon some input received by processor 606.

Referring now to FIG. 7, a flow chart 700 of operations performed using the system of FIG. 6 is provided. At 702, a determination is made that a feature of present sealed boat seat suspension needs to be adjusted. Such a determination can be made, for example, by a user visually detecting that boat seat 616 is not at a desired initial seat height, by the user determining that boat seat 616 is not being sufficiently dampened during use of the boat (e.g., the damping is too stiff), or any of numerous other observations. In an electronic system or an input-based system, such a determination may be based upon information provided to or received from processor 606.

At 704, at least one feature (e.g., air pressure within suspension component 160 or operation of an active valve within suspension component 160) of sealed boat seat suspension is adjusted. As indicated at 704, such an adjustment can be made in a passive system, as depicted by 706. In such a passive system, an adjustment is made to, for example, an air pressure of suspension component 160 by a user manually altering the air pressure of suspension component 160 by, for example, manually pumping air into or manually removing air from suspension component 160.

Referring still to 704 of FIG. 7, such an adjustment can be made in an electronic system, as depicted by 708. In such an electronic system, an adjustment is made to, for example, an air pressure of suspension component 160 (or an active valve within suspension component 160) when a user interacts with graphic user interface and thereby directs system 600 to alter an air pressure of suspension component 160 (or an active valve within suspension component 160).

Referring yet again to 704 of FIG. 7, such an adjustment can also be made in an input-based system, as depicted by 710. In such an input-based system, an adjustment is made to, for example, an air pressure of suspension component 160 (or an active valve within suspension component 160) when processor 606 autonomously makes changes to, for example, an air pressure of suspension component 160 (or an active valve within suspension component 160) based upon some input received by processor 606.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A console-mounted sealed boat seat suspension comprising:
   a console;
   a bottom bracket mounted to said console;
   a top bracket mounted to said console;
   a first inner tube having a first end coupled to said bottom bracket and a second end coupled to said top bracket;
   a first outer tube disposed surrounding at least a portion of said first inner tube and disposed in a sealed arrangement with respect to said first inner tube, said first outer tube slidable along said first inner tube at least partially between said bottom bracket and said top bracket, wherein said first inner tube and said first outer tube comprise a first rail;
   a second inner tube having a first end coupled to said bottom bracket and a second end coupled to said top bracket;
   a second outer tube disposed surrounding at least a portion of said second inner tube and disposed in a sealed arrangement with respect to said second inner tube, said second outer tube slidable along said second inner tube at least partially between said bottom bracket and said top bracket, wherein said second inner tube and said second outer tube comprise a second rail;
   a boat seat attachment component coupled to said first outer tube and said second outer tube, said boat seat attachment component movable with said first outer tube and said second outer tube at least partially between said bottom bracket and said top bracket; and
   a suspension component coupled to said boat seat attachment component such that said suspension component provides at least some control of movement of said boat seat attachment component as said boat seat attachment component moves at least partially between said bottom bracket and said top bracket.

2. The console-mounted sealed boat seat suspension of claim 1 wherein said first rail contains no spring and/or damping components.

3. The console-mounted sealed boat seat suspension of claim 1 wherein said second rail contains no spring and/or damping components.

4. The console-mounted sealed boat seat suspension of claim 1 wherein at least one of said first rail and said second rail contains spring and/or damping components.

5. The console-mounted sealed boat seat suspension of claim 1 wherein said first rail further comprises:
   a seal;
   a bushing; and
   an oil bath configured to provide for lubrication between an interior surface of said first outer tube and an outer surface of said first inner tube.

6. The console-mounted sealed boat seat suspension of claim 5 further comprising:
   a wiper, said bushing disposed near said wiper.

7. The console-mounted sealed boat seat suspension of claim 1 further comprising:
   a top double clamp, said top double clamp coupling said first rail to said top bracket.

8. The console-mounted sealed boat seat suspension of claim 7 wherein said top double clamp further couples said second rail to said top bracket.

9. The console-mounted sealed boat seat suspension of claim 1 further comprising:
   a bottom double clamp, said bottom double clamp coupling said first rail to said bottom bracket.

10. The console-mounted sealed boat seat suspension of claim 9 wherein said bottom double clamp further couples said second rail to said bottom bracket.

11. The console-mounted sealed boat seat suspension of claim 1 wherein said boat seat attachment component further comprises:
    a plurality of openings to accommodate the coupling of boat seat attachment features with said boat seat attachment component.

12. The console-mounted sealed boat seat suspension of claim 1 wherein said suspension component is coupled between a static portion of said sealed boat seat suspension and a movable portion of sealed boat seat suspension to provide said at least some control of movement of said boat seat attachment component as said boat seat attachment component moves at least partially between said bottom bracket and said top bracket.

* * * * *